Jan. 11, 1938.    C. PRESS    2,105,297
BRAKE
Filed Dec. 7, 1936

INVENTOR
CARL PRESS
BY M. W. McConkey
ATTORNEY

Patented Jan. 11, 1938

2,105,297

UNITED STATES PATENT OFFICE 2,105,297

BRAKE

Carl Press, South Bend, Ind.

Application December 7, 1936, Serial No. 114,626

2 Claims. (Cl. 188—79.5)

This invention relates to brakes, and is illustrated as embodied in an internal expanding brake for an automobile. An object of the invention is to provide a simple and easily operated adjuster for compensating for the wear of the brake shoes.

In one desirable arrangement the adjuster comprises three main parts: A socket, a stem extending into the socket, and an adjusting member. The socket, at least adjacent its open end, is considerably larger in diameter than the stem, and the adjusting member has a sleeve threaded on the stem and rotatably received in this part of the socket. Preferably the adjusting member has a disk-shaped operating portion projecting beyond the periphery of the socket at the open end of the latter.

The above and other objects and features of the invention will be apparent from the following description of the illustrative embodiments shown in the accompanying drawing, in which.

Figure 2:
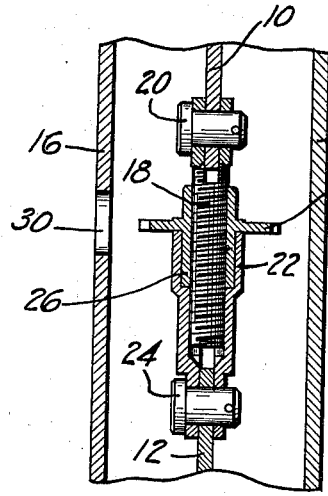
Figure 2 is a partial section through the brake on the line 2—2 of Figure 1.
Figure 1:
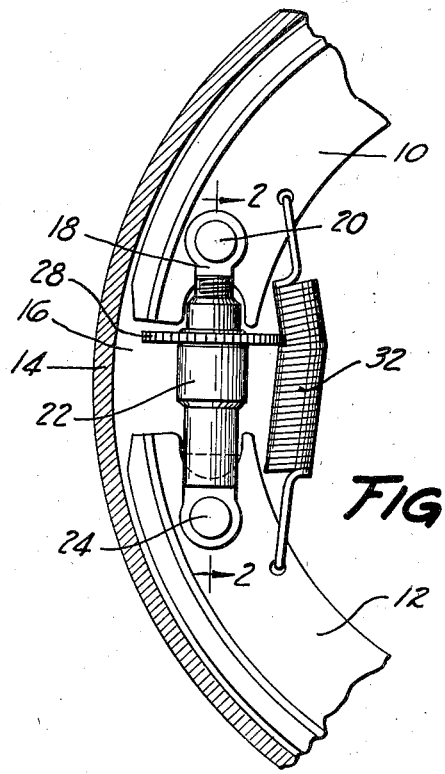
Figure 1 is a partial section through a brake, just inside the head of the brake drum, and showing the adjuster in side elevation.

The brake illustrated in Figures 1 and 2 is of the type in which two floating shoes 10 and 12 are engageable with a drum 14 in such a manner that when the drum is turning in one direction one of them anchors on means (not shown) carried by a backing plate 16, while when the drum 14 is turning in the opposite direction the other shoe so anchors.

A threaded stem 18 is connected to the shoe 10, for example by a pivot 20, and extends into a socket 22 similarly connected to the shoe 12 by a pivot 24. At least that part of the socket 22 adjacent its open end is considerably larger in diameter than the stem 18, and rotatably receives a sleeve 26 threaded on the stem 18 and forming part of an adjusting member having a disk-shaped operating portion 28 projecting beyond the periphery of the socket 22. This portion of the adjusting member is accessible through an opening 30 in the backing plate 16, and is shown as formed with teeth to facilitate turning it and yieldingly to interlock with a spring 32 tensioned between the shoes.

Figure 3:
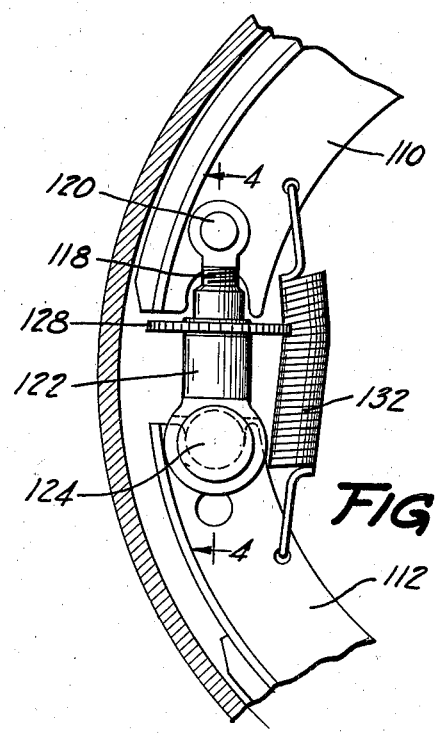
Figure 3 is a partial section similar to Figure 1, but showing another embodiment.
Figure 4:
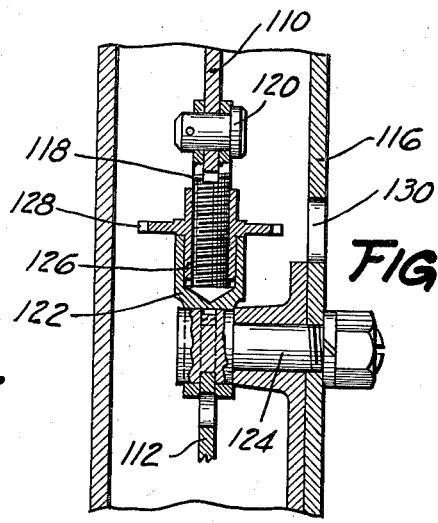
Figure 4 is a partial section through this brake on the line 4—4 of Figure 3.

In the arrangement of Figures 3 and 4, shoe 112 is notched at its end for direct engagement with a fixed anchor post 124 carried by the backing plate 116. The shoe 110 has a threaded stem 118 connected at its end by a pivot 120, on which is threaded the sleeve 126 of an adjusting member having an operating portion 128, the sleeve 126 being rotatably journaled in a socket 122 which is notched at its end for direct engagement with the anchor 124.

To make shoes 110 and 112 interchangeable, both of them may be notched at the end and both of them may have openings for the pivot 120.

While two illustrative embodiments have been described in detail, it is not my intention to limit the scope of the invention to those particular embodiments, or otherwise than by the terms of the appended claims.

I claim:

1. A brake adjuster comprising a socket and a stem extending into the socket, said socket having at least the portion adjacent its open end substantially greater in diameter than said stem, and an adjusting member having a sleeve threaded onto said stem and having a smooth cylindrical exterior rotatably seated in said portion of the socket and having a part seated against the end of the socket.

2. A brake adjuster comprising a socket and a stem extending into the socket, said socket having at least the portion adjacent its open end substantially greater in diameter than said stem, and an adjusting member having a sleeve threaded onto said stem and having a smooth cylindrical exterior rotatably seated in said portion of the socket, said member being formed with a disk-shaped operating portion projecting beyond the periphery of the socket at the open end of the latter and seated against the end of the socket.

CARL PRESS.